United States Patent
Hixenbaugh et al.

(10) Patent No.: US 10,302,153 B2
(45) Date of Patent: May 28, 2019

(54) WEDGE CLUTCH WITH INTEGRATED ARMATURE

(71) Applicant: SCHAEFFLER TECHNOLOGIES AG & CO. KG., Herzogenaurach (DE)

(72) Inventors: Joshua Hixenbaugh, Wooster, OH (US); Justin Bitar, Waxhaw, NC (US)

(73) Assignee: SCHAEFFLER TECHNOLOGIES AG & CO. KG, Herzogenaurach (DE)

(*) Notice: Subject to any disclaimer, the term of this patent is extended or adjusted under 35 U.S.C. 154(b) by 53 days.

(21) Appl. No.: 15/456,705

(22) Filed: Mar. 13, 2017

(65) Prior Publication Data
US 2018/0259008 A1  Sep. 13, 2018

(51) Int. Cl.
*F16D 27/108* (2006.01)
*F16D 15/00* (2006.01)

(52) U.S. Cl.
CPC .......... *F16D 27/108* (2013.01); *F16D 15/00* (2013.01)

(58) Field of Classification Search
CPC ........ F16D 15/00; F16D 27/02; F16D 27/025; F16D 13/04; F16D 13/06; F16D 13/14; F16D 13/16; F16D 13/18; F16D 13/62; F16D 13/64
See application file for complete search history.

(56) References Cited

U.S. PATENT DOCUMENTS

| | | |
|---|---|---|
| 8,936,143 B2 | 1/2015 | Wagers |
| 9,115,768 B2 | 8/2015 | Sturgin |
| 9,644,690 B2 | 5/2017 | Lee |
| 2014/0014455 A1 | 1/2014 | Davis |
| 2014/0110207 A1 | 4/2014 | Davis |
| 2015/0014113 A1 | 1/2015 | Ohr et al. |
| 2015/0027840 A1* | 1/2015 | Lee .......... F16D 13/16 192/45.1 |
| 2015/0060223 A1* | 3/2015 | Ohr .......... F16D 41/082 192/45.1 |
| 2015/0083539 A1 | 3/2015 | Lee et al. |
| 2015/0152921 A1 | 6/2015 | Lee |
| 2015/0152922 A1 | 6/2015 | Lee et al. |
| 2016/0032988 A1* | 2/2016 | He .......... F16D 41/063 192/45.1 |

(Continued)

OTHER PUBLICATIONS

International Search Report and Written Opinion for International Application No. PCT/US2018/016155 dated May 15, 2018.

(Continued)

*Primary Examiner* — Charles A Fox
*Assistant Examiner* — Lori Wu
(74) *Attorney, Agent, or Firm* — Brooks Kushman P.C.

(57) ABSTRACT

A wedge clutch includes a hub supported for rotation about an axis and having an outer surface about a peripheral of the hub. The outer surface has a plurality of ramped surfaces. A carrier is also supported for rotation about the axis and has an inner surface. An inner surface of the disk is configured to slide along the ramped surfaces of the hub. The disk is moveable between an expanded position in which an outer surface of the disk engages the inner surface of the carrier to lock the clutch and a contracted position in which the clutch is unlocked. An armature is disposed in the disk and is configured to react to an electromagnetic force to alter the disk between the expanded position to the contracted position.

19 Claims, 2 Drawing Sheets

(56) References Cited

U.S. PATENT DOCUMENTS

| | | |
|---|---|---|
| 2016/0069400 A1 | 3/2016 | Mordukhovich et al. |
| 2016/0084326 A1 | 3/2016 | Ramsey |
| 2016/0138662 A1 | 5/2016 | He |
| 2016/0238090 A1 | 8/2016 | Spencer et al. |
| 2016/0298702 A1 | 10/2016 | He |
| 2016/0341262 A1 | 11/2016 | Ramsey |

OTHER PUBLICATIONS

Lee, Brian, "AWD Disconnect, Escaping the clutches of the dog", Schaeffler Symposium 2014, 27 pages.

\* cited by examiner

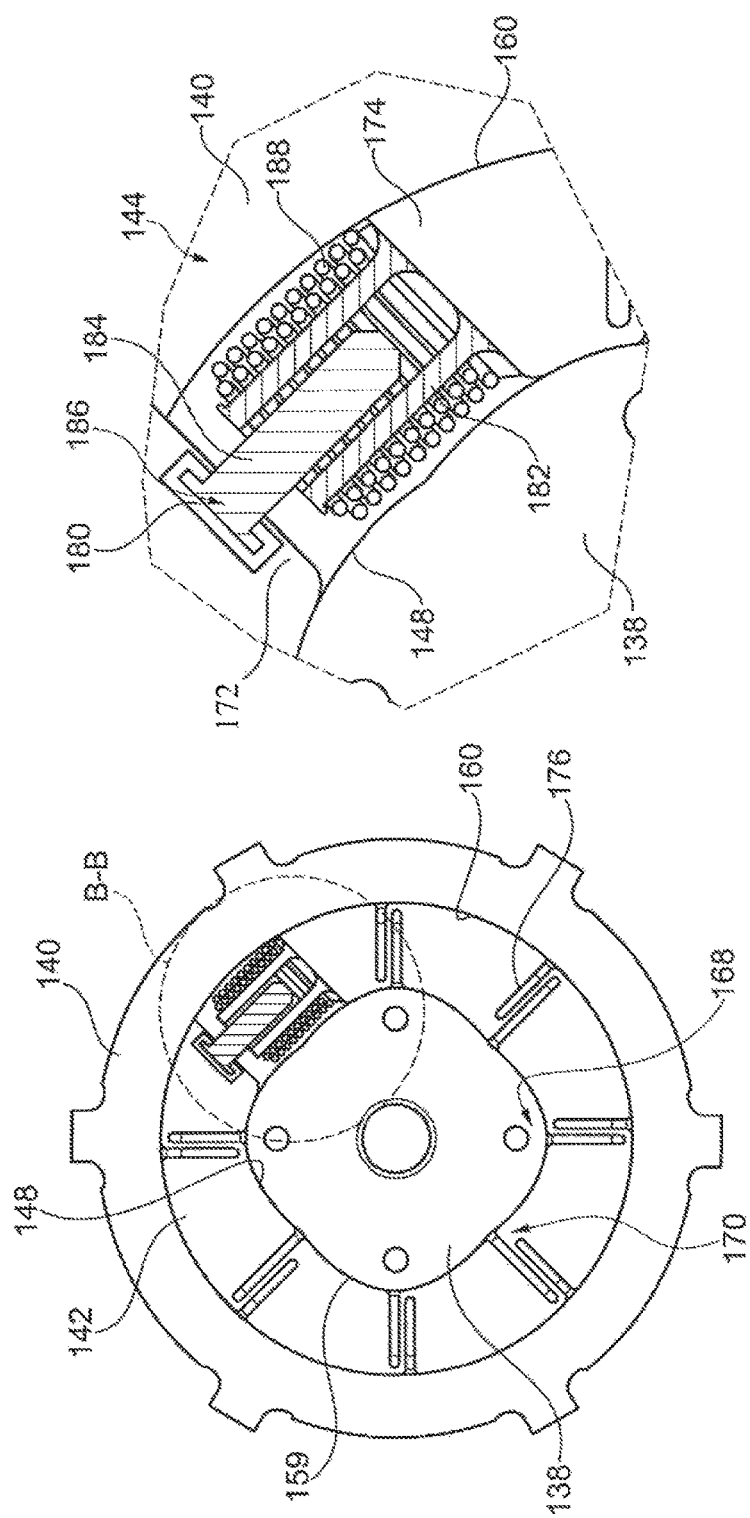

WEDGE CLUTCH WITH INTEGRATED ARMATURE

TECHNICAL FIELD

The present disclosure relates to a wedge clutch for selectively coupling two or more powertrain components to each other.

BACKGROUND

In a motor vehicle, a four-wheel drive system or an all-wheel drive system can be selectively activated by a clutch. The clutch can be part of a power transfer unit (PTU) for connecting a power source to a secondary drive shaft when it is desired to deliver power to the secondary drive shaft. It is known that such a clutch can be a dog clutch. Dog clutches are prone to teeth clash or blocking. It is also known that such a clutch can be a wet clutch in a differential. Pressurized fluid must be continuously supplied to keep the clutches in a closed mode, adding to the power usage associated with usage of the clutch.

Such a clutch can also be a wedge clutch. A wedge clutch can include an inner race connected to an input or output shaft, and an outer race connected to the other of the shafts. A wedge plate can be radially disposed between the inner and outer races and be configured to engage the inner and outer races when the clutch is locked to transmit power from the input shaft to the output shaft.

SUMMARY

According to one embodiment, a clutch comprises a hub supported for rotation about an axis and having an outer surface about a peripheral of the hub. The outer surface has a plurality of ramped surfaces. The clutch includes a carrier supported for rotation about the axis and having an inner surface. The clutch includes a disk having an inner surface configured to slide along the ramped surfaces of the hub and an outer surface. The disk is moveable between an expanded position in which an outer surface of the disk engages the inner surface of the carrier to lock the clutch and a contracted position in which the clutch is unlocked. The disk further includes a first end and a second end circumferentially spaced apart from each other. The clutch includes an armature extending from the first end and toward the second end. The armature is configured to pull the first end toward the second end in response to an electromagnetic force to alter the disk from the expanded position to the contracted position.

The clutch may also include a plurality of electromagnetic coils between the first end and the second end of the disk, the electromagnetic coils configured to supply the electromagnetic force to the armature to pull the first end toward the second end. The electromagnetic coils may surround an outer surface of the armature.

The clutch may further include a plurality of projections or fingers extending from the second end and toward the first end. The projections may collectively define an opening sized to receive the armature. Electromagnetic coils may surround the projections.

The first end may define a pocket, and the armature may include a head received by the pocket. An electrical insulator may be disposed within the pocket to surround at least a portion of the head to electrically insulate the armature from the disk.

According to another embodiment, a wedge clutch includes a first race supported for rotation about an axis, and a second race supported for rotation about the axis. An annular member is slidably seated against the first race and is configured to selectively radially expand or contract against the second race to selectively lock the first race to the second race. An electromagnetic armature is integrated into the annular member to selectively expand or contract the annular member to unlock the first race from the second race.

According to yet another embodiment, a wedge clutch includes an inner race, an outer race, and a disk configured to radially expand and contract to selectively lock and unlock the inner race to the outer race. The disk has a first end and a second end that cooperate to define a gap therebetween. Electromagnetic coils are integrated into the disk that, when activated, pull the first end toward the second end to constrict the disk.

BRIEF DESCRIPTION OF THE DRAWINGS

FIG. 2A is a cross-sectional view of a clutch having an integrated armature, according to one embodiment.

FIG. 2B is an enlarged view of a region within line B-B of FIG. 2A.

DETAILED DESCRIPTION

Figure 1:
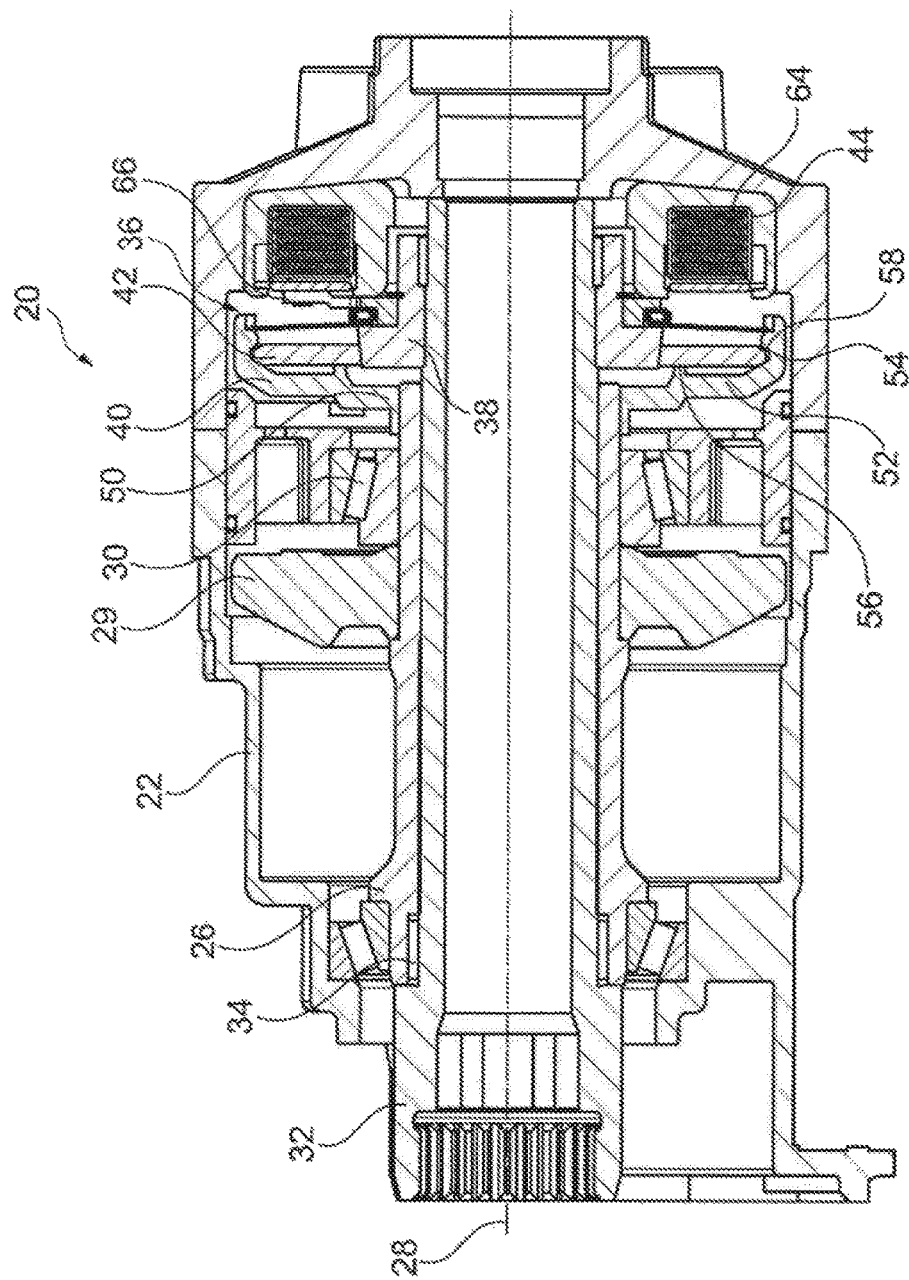
FIG. 1 is a side cross-sectional view of a power transfer unit having a wedge clutch, according to one embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Referring to FIG. 1, a power transfer unit 20 (PTU) for a powertrain is shown. The PTU 20 may be for an all-wheel-drive motor vehicle such as a passenger car or truck. The PTU 20 includes a housing 22 that supports an input shaft 26 for rotation about an axis 28 via bearings 30. A gear 29 may be fixed to the input shaft 26 by a spline connection. The gear 29 may be driveably connected to a transmission output shaft. Two components may be considered "driveably connected" if they are connected by a power flow path that constrains their rotational speeds to be directly proportional. An output shaft 32 is disposed in the housing 22 and is supported for rotation about the axis 28 via bearings 34.

A wedge clutch 36 is disposed in the housing 22 and selectively couples the input shaft 26 to the output shaft 32 to transfer torque from the input shaft 26 to the output shaft 32. The clutch 36 has a closed state (also referred to as a locked state) in which the input and output shafts are coupled to each other and an open state (also referred to as an unlocked state) in which the input and output shafts are independently rotatable relative to each other.

In the embodiment shown in FIG. 1, the wedge clutch 36 includes a hub 38 (which may be referred to as an inner race), a carrier 40, and a disk 42 (which may be referred to as a wedge plate) that are all supported for rotation about the axis 28. The hub 38 includes an inner surface connected to the output shaft 32 and an outer ramped surface 48. The carrier 40 includes a base 50 connected to the input shaft 26, a radially extending portion 52, and an axially extending portion 54 (which may be referred to as an outer race). A projection 56 extends axially from the radially extending portion 52 and cooperates with the axially extending portion 54 to define a pocket recessed into the carrier 40.

The embodiment in FIG. 1 includes an actuator 44 that moves the clutch between the open and closed states. The actuator 44 may be an electric actuator, as shown, or may be a hydraulic or mechanical actuator. In one embodiment, the electric actuator 44 includes electric coils 64 and an armature 66. The armature 66 is connected to the hub 38 and slides the hub towards the carrier 40 or away from the carrier 40, depending upon an energization state of the coils 64, to operate the clutch. In other embodiments, the actuator is energized to close the clutch and a spring biases the clutch to an open state.

The disclosure above with respect to FIG. 1 is part of U.S. patent application Ser. No. 15/388,270, which is hereby incorporated by reference. Other structural arrangements are contemplated, such as that disclosed in U.S. patent application Ser. No. 15/388,239, which is hereby incorporated by reference. As can be seen in FIG. 1, the actuator 44, coils 64 and armature 66 require necessary packaging space. According to various embodiments of this disclosure, the disk is modified to include the electromagnetic actuator within the disk itself. This allows the disk to change between the open and closed states from the electromagnetic actuator built into the disk itself.

FIGS. 2A-2B show a disk 142 similar to the disk 42 of FIG. 1. Structure shown in FIGS. 2A-2B that is similar to that of FIG. 1 is provided with a reference number that is increased by 100. For example, the disk illustrated in FIGS. 2A-2B is now labeled as disk 142. The disk 142 can be retrofitted and inserted into the PTU of FIG. 1. However, as will be explained, the disk 142 is provided with its own embedded actuator 144 which can eliminates the need for the actuator 44 of FIG. 1.

The disk 142 may be located radially between the hub 138 and the axially extending portion 54 of the carrier. An inner edge 159 of the disk 142 defines an opening that receives the hub 138 and is seated on ramped surface 148 of the hub 138. An outer edge 160 of the disk 142 is disposed in a groove 58 of the carrier 140.

The clutch 36 can be biased to be in a normally closed position. In this closed position, the disk 142 is in a radially-expanded position in which the outer edge 160 presses radially outward to frictionally engage with the groove 58. Meanwhile, the ramped surface 148 of the hub 138 frictionally engages with the inner edge 159 of the disk 142. This couples the carrier 140 to the hub 138, creating a power flow path between the input shaft 26 and the output shaft.

In one embodiment, the ramped surface 148 of the hub 138 defines cams 168 that ramp radially outward form the center of the hub. The cams 168 cooperate with cams 170 on the inner edge 159 of the disk 142 to force the disk 142 radially outward to engage with the axially extending portion 54 when the clutch is locked. The outer surface of the hub 138 may also be spiral-shaped with respect to the central axis. This assures that as the disk 142 is expanded or contracted, it remains in contact with the hub 138. The hub 138 can rotate with respect to the central axis to assure contact is maintained with between the hub 138 and the disk 142 during expansion and contraction of the disk 142.

The disk 142 may have a gap or split that extends completely through the disk 142, between two separated ends of the disk 142: a first end 172 of the disk and a second end 174 of the disk. The disk 142 may also have a plurality of slots 176 that extend only partially into the disk. As shown in FIG. 2A, some of the slots 176 can extend from the outer surface of the disk 142, while other slots 176 extend from the inner surface of the disk 142. A pair of alternating slots 176 can be grouped together. The slots 176 facilitate radial expansion of the disk 142. In other embodiments, the disk 142 may include multiple separated segments that are retained together by an annular resilient member such as a snap ring.

To open the clutch 36, the disk 142 is radially constricted. To do so, the disk 142 is provided with an electromagnetic actuator 144. In one embodiment, the first end 172 of the disk defines a pocket 180, and the second end 174 of the disk includes a plurality of projections or fingers 182. The pocket 180 can extend into the first end 172 of the disk 142 in a circumferential direction about the central axis 28. Similarly, the fingers 182 can extend from the second end 174 of the disk 142 in a circumferential direction. An armature 184 has a head 186 that extends into the pocket 180. In one embodiment, the armature 184 is metallic and magnetic to react with electromagnetic coil windings described below. The armature 184 can be made of or contain a permanent magnet material to provide bi-directional reaction depending on the polarity of the current supplied from the coils.

The head 186 can be connected to the first end 172 via an insulated connection in the pocket 180. The insulated connection may be provided by a material suitable as an electrical insulator (e.g., glass, ceramic, porcelain, polymer composite, etc.) in the pocket 180 surrounding the head 186. The insulated connection holds the head 186 of the armature 184 in the pocket while preventing any continuity from the coils (described below) to the armature 184. In other embodiments, the insulated material is not provided, and the ends of the wedge plate can attract themselves regardless of the insulated material.

A plurality of coils 188, such as copper windings, are wrapped around the fingers 182. While not known in the figures, the coils 188 can be wrapped around a spool or bobbin so that the coils 188 do not directly contact the fingers 182. The coils 188 can be energized from an electric source, for example. In one embodiment, when the electric source is off and the coils 188 are not energized, the disk 142 is biased outwardly in the locked position, explained above. The disk 142 climbs the ramped surfaces of the inner race or hub 138, causing the outer diameter of the disk 142 to be extended and lock into the outer race or axially extending portion 54 of the carrier 140. When the electric source is on and the coils 188 are energized, the armature 184 is pulled toward the second end 174 of the disk. This causes the first end 172 of the disk to be pulled toward the second end 174 of the disk, which contracts the outer diameter of the disk 142. This prevents the disk 142 from being able to climb the ramps of the hub 138, and therefore the clutch is unlocked.

In one embodiment, the fingers 182 are integrally formed with the disk 142, although other embodiments are contemplated in which the fingers 182 are separate pieces connected (e.g., welded) to the disk 142.

The addition of the structure shown in FIGS. 2A-2B, such as the armature 184 and coils 188, provide the locking and unlocking function of the wedge plate or disk 142. Therefore, the disk 142 and the structure shown in FIGS. 2A-2B can be implemented into the PTU 20 and the actuator 44, coils 64 and armature 66 can be removed from the PTU 20.

Wedge clutches may be used in many different applications other than in a PTU. Wedge clutches may be used in any application that requires two or more rotating components to be selectively coupled together.

This disclosure is not limited to the illustrated embodiments that show the outer race defining the groove and the inner race defining the ramped surface. In other embodiments, the placement of the hub and carrier are switched with the carrier being the inner race and the hub being the outer race. There, the inner edge of the disk engages with a groove defined in the inner race, and the outer edge of the disk is disposed on the ramped surface of the outer race. In that embodiment, contraction of the disk forces or "wedges" the disk into the groove of the inner race to lock the clutch. The wedge clutch may be a normally-unlocked clutch in this configuration.

Although this disclosure teaches using the electromagnetic force to constrict the disk, other embodiments are contemplated in which the electromagnetic force is used to expand the disk.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A clutch comprising:
   a hub supported for rotation about an axis and having an outer surface about a peripheral of the hub, the outer surface having a plurality of ramped surfaces;
   a carrier supported for rotation about the axis and having an inner surface;
   a disk having an inner surface configured to slide along the ramped surfaces of the hub and an outer surface, the disk being moveable between an expanded position in which the outer surface of the disk engages the inner surface of the carrier to lock the clutch and a contracted position in which the clutch is unlocked, the disk further having a first end and a second end circumferentially spaced apart from each other;
   an armature extending from the first end and toward the second end, the armature configured to pull the first end toward the second end in response to an electromagnetic force to alter the disk from the expanded position to the contracted position; and
   a plurality of projections extending from the second end and toward the first end.

2. The clutch of claim 1, further comprising a plurality of electromagnetic coils between the first end and the second end of the disk, the electromagnetic coils configured to supply the electromagnetic force to the armature to pull the first end toward the second end.

3. The clutch of claim 2, wherein the electromagnetic coils surround an outer surface of the armature.

4. The clutch of claim 1, wherein the projections collectively define an opening sized to receive the armature.

5. The clutch of claim 1, further comprising a plurality of electromagnetic coils surrounding the projections.

6. The clutch of claim 1, wherein the first end defines a pocket and the armature includes a head received by the pocket.

7. The clutch of claim 6, further comprising an electrical insulator within the pocket surrounding at least a portion of the head to electrically insulate the armature from the disk.

8. A wedge clutch comprising:
   a first race supported for rotation about an axis;
   a second race supported for rotation about the axis;
   an annular member slidably seated against the first race and configured to selectively radially expand or contract against the second race to selectively lock the first race to the second race; and
   an electromagnetic armature integrated into the annular member to selectively expand or contract the annular member to unlock the first race from the second race.

9. The wedge clutch of claim 8, wherein the annular member defines a gap between a first end and a second end of the annular member, and the armature extends from the first end and into the gap.

10. The wedge clutch of claim 9, further comprising an electromagnetic coil configured to, when energized, force the armature in a direction to radially expand or contract the annular member.

11. The wedge clutch of claim 10, wherein the electromagnetic coil is configured to, when energized, radially contract the annular member away from the second race to unlock the second race from the first race.

12. The wedge clutch of claim 10, further comprising a plurality of fingers extending from the second end and partially toward the first end, wherein the fingers are spaced from the armature and collectively define an opening that receives the armature.

13. The wedge clutch of claim 12, wherein the electromagnetic coil is wrapped around the fingers.

14. A wedge clutch comprising:
   an inner race;
   an outer race;
   a disk configured to radially expand and contract to selectively lock and unlock the inner race to the outer race, the disk having a first end and a second end defining a gap therebetween; and
   electromagnetic coils integrated into the disk that, when activated, pull the first end toward the second end to constrict the disk.

15. The wedge clutch of claim 14, wherein the electromagnetic coils are disposed in the gap.

16. The wedge clutch of claim 14, wherein the inner race has a ramped surface, and the disk has an inner surface configured to slide along the ramped surface when the electromagnetic coils are energized.

17. The wedge clutch of claim 14, further comprising an armature in the gap extending from the first end and toward the second end, wherein the armature pulls the first end toward the second end when the electromagnetic coil is energized.

18. The wedge clutch of claim 17, further comprising a plurality of fingers in the gap extending from the second end and toward the first end, wherein the fingers collectively define an opening that receives the armature.

19. The wedge clutch of claim 18, wherein the electromagnetic coils are wrapped around the fingers.

\* \* \* \* \*